Figure 1:
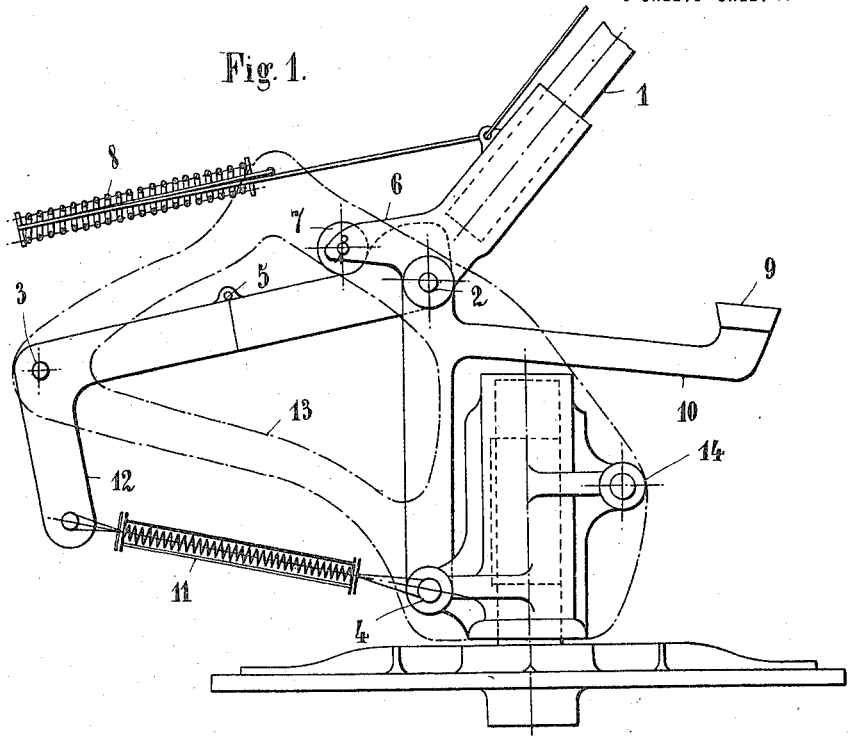

C. E. & P. PIGACHE.
TROLLEY POLE DEVICE WITH AUTOMATIC RELEASE AND FOLDING.
APPLICATION FILED FEB. 12, 1915.

1,187,782.   Patented June 20, 1916.
9 SHEETS—SHEET 1.

WITNESSES:
E. G. McGee.
W. H. Brereton.

INVENTORS:
Charles E. Pigache
and
Pierre Pigache
By Emil Bouwelycke
ATTORNEY.

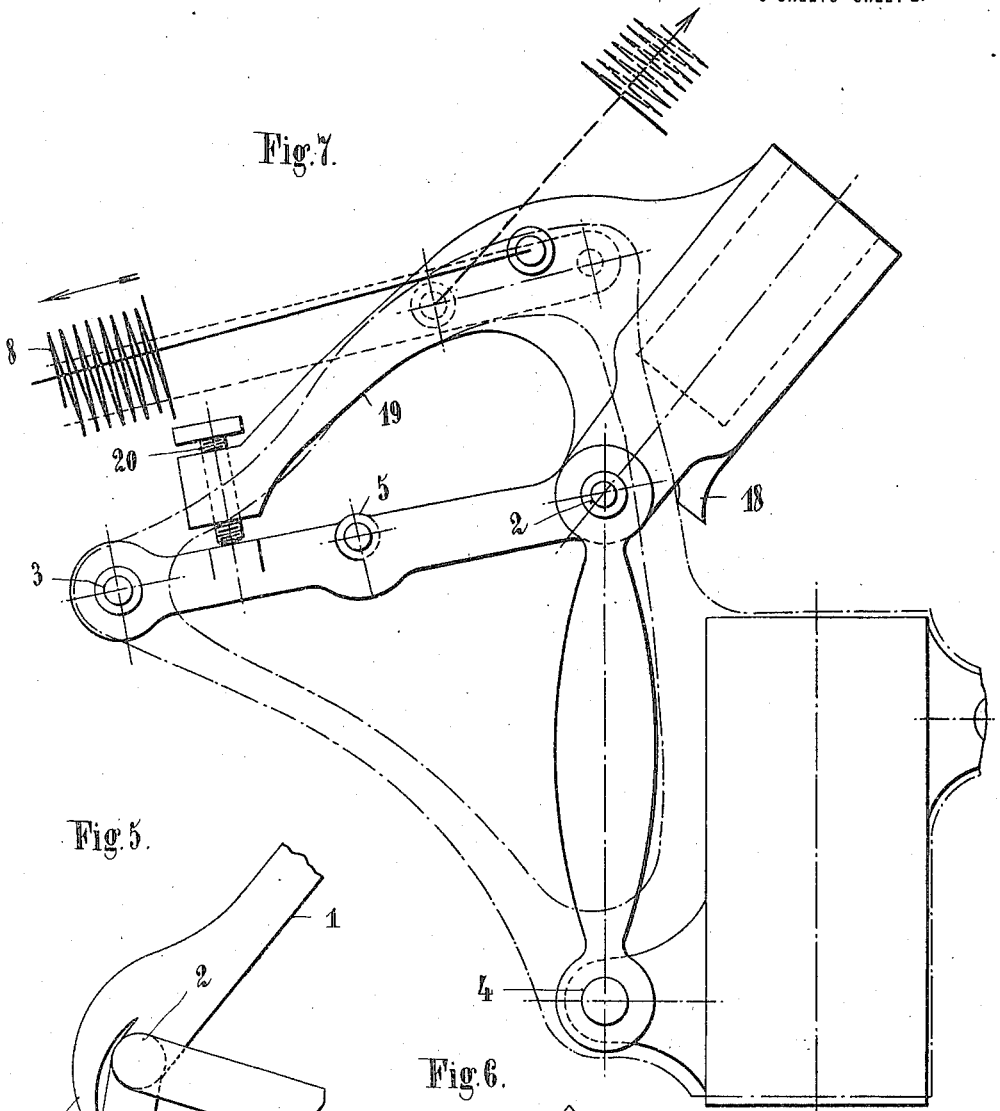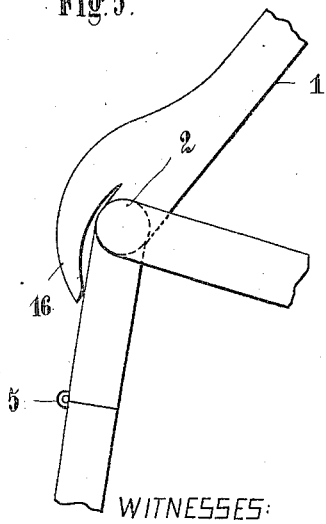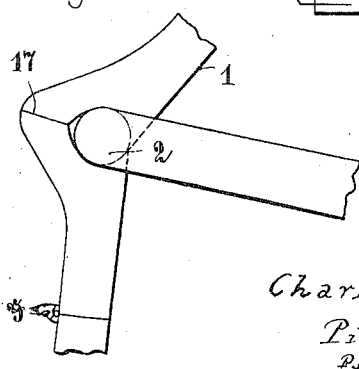

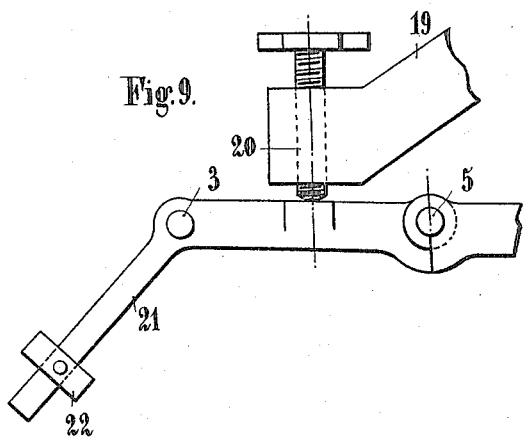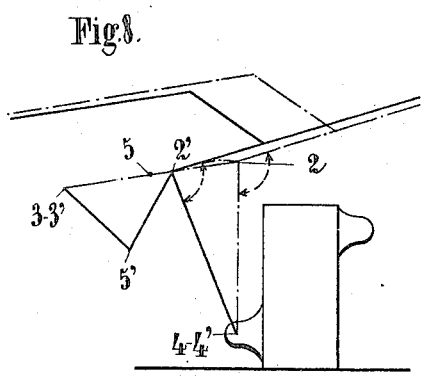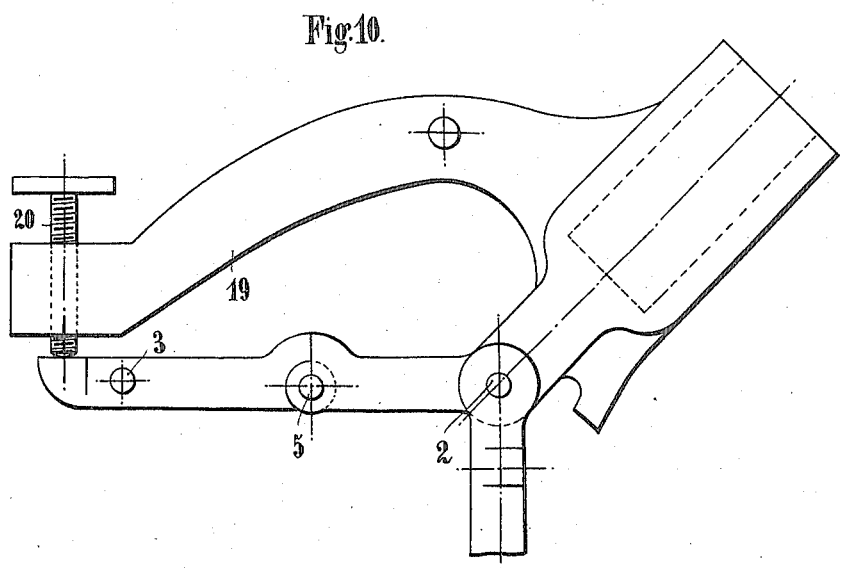

C. E. & P. PIGACHE.
TROLLEY POLE DEVICE WITH AUTOMATIC RELEASE AND FOLDING.
APPLICATION FILED FEB. 12, 1915.

1,187,782.

Patented June 20, 1916.
9 SHEETS—SHEET 4.

WITNESSES:
E. G. McGee.
W. H. Brereton.

INVENTORS:
Charles E. Pigache
and
Pierre Pigache
By Emil Bönnelycke
ATTORNEY

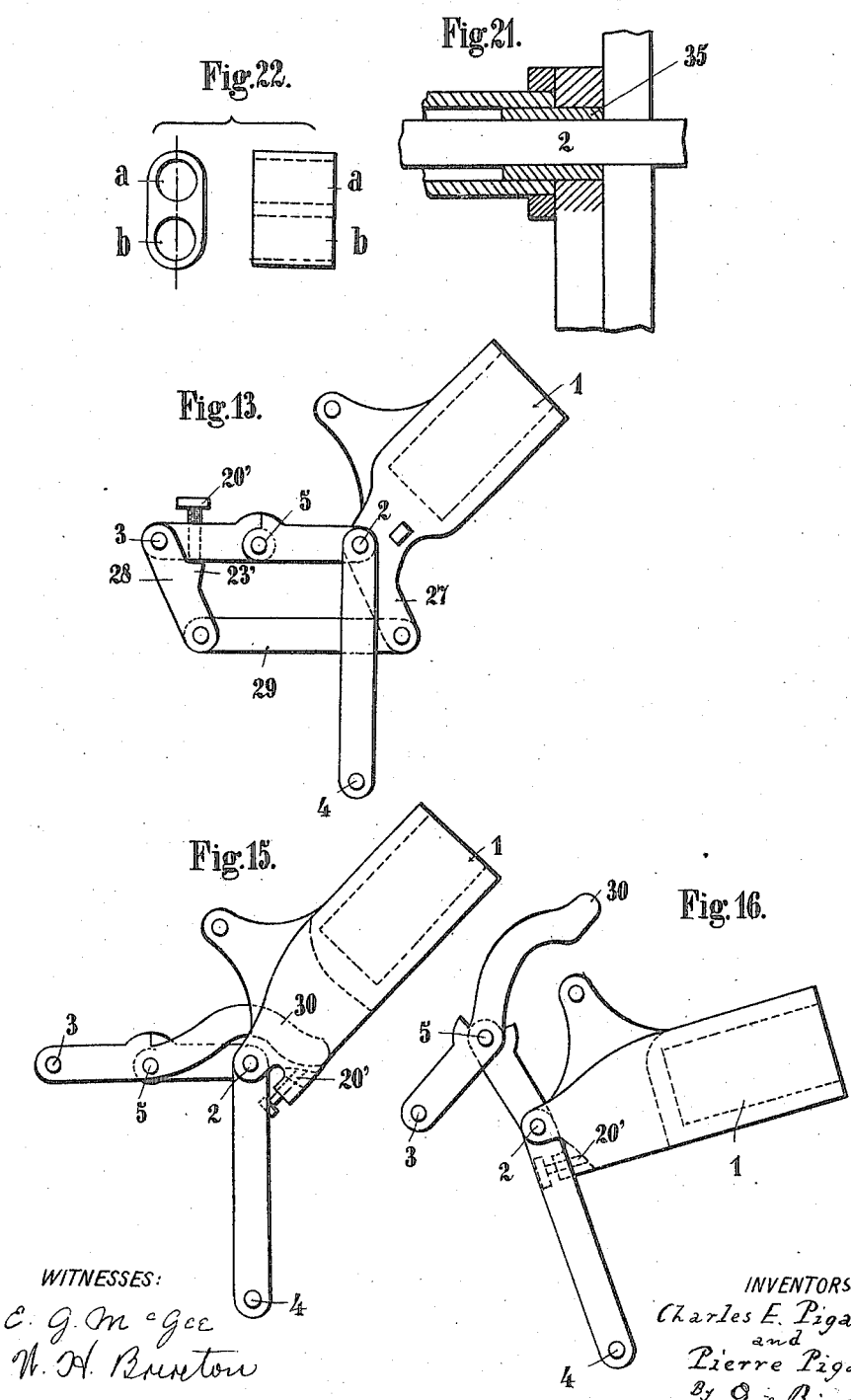

C. E. & P. PIGACHE.
TROLLEY POLE DEVICE WITH AUTOMATIC RELEASE AND FOLDING.
APPLICATION FILED FEB. 12, 1915.
1,187,782.
Patented June 20, 1916.
9 SHEETS—SHEET 6.
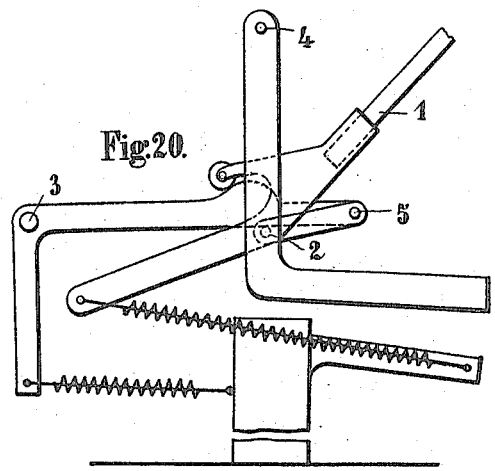
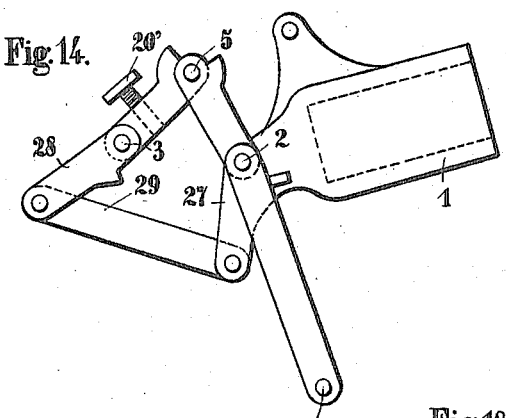
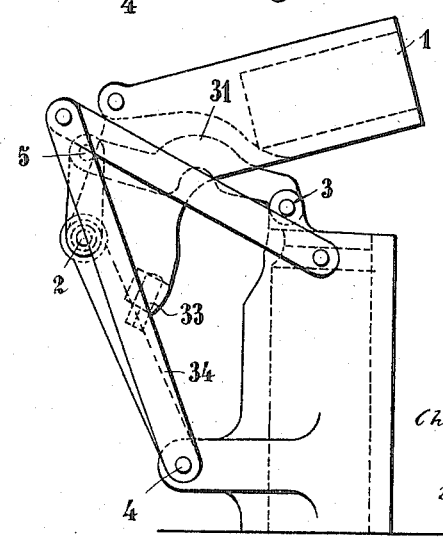
WITNESSES:
E. G. McGee.
W. H. Brereton
INVENTORS:
Charles E. Pigache
and
Pierre Pigache
By Emile Bouwelycke
ATTORNEY.

C. E. & P. PIGACHE.
TROLLEY POLE DEVICE WITH AUTOMATIC RELEASE AND FOLDING.
APPLICATION FILED FEB. 12, 1915.

1,187,782.

Patented June 20, 1916.
9 SHEETS—SHEET 7.

WITNESSES:
E. G. McGee
W. H. Breiston

INVENTORS:
Charles E. Pigache
and
Pierre Pigache
By Emil Bönnelycke
ATTORNEY.

C. E. & P. PIGACHE.
TROLLEY POLE DEVICE WITH AUTOMATIC RELEASE AND FOLDING.
APPLICATION FILED FEB. 12, 1915.

1,187,782.

Patented June 20, 1916.
9 SHEETS—SHEET 8.

WITNESSES
E. G. McGee.
W. H. Brereton

INVENTORS:
Charles E. Pigache
and
Pierre Pigache
By Emil Bauwelyche
ATTORNEY

C. E. & P. PIGACHE.
TROLLEY POLE DEVICE WITH AUTOMATIC RELEASE AND FOLDING.
APPLICATION FILED FEB. 12, 1915.
1,187,782.
Patented June 20, 1916.
9 SHEETS—SHEET 9.
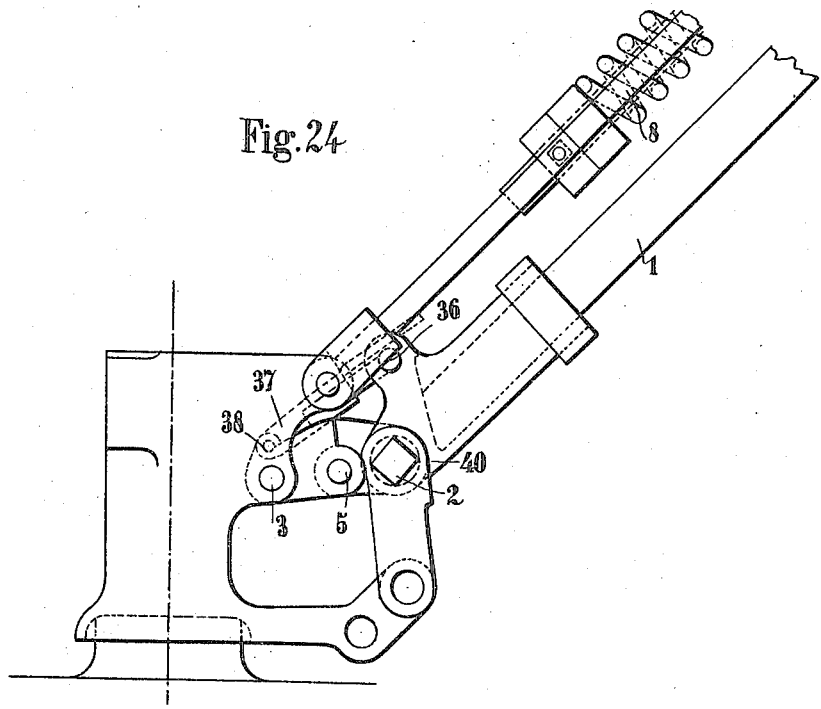
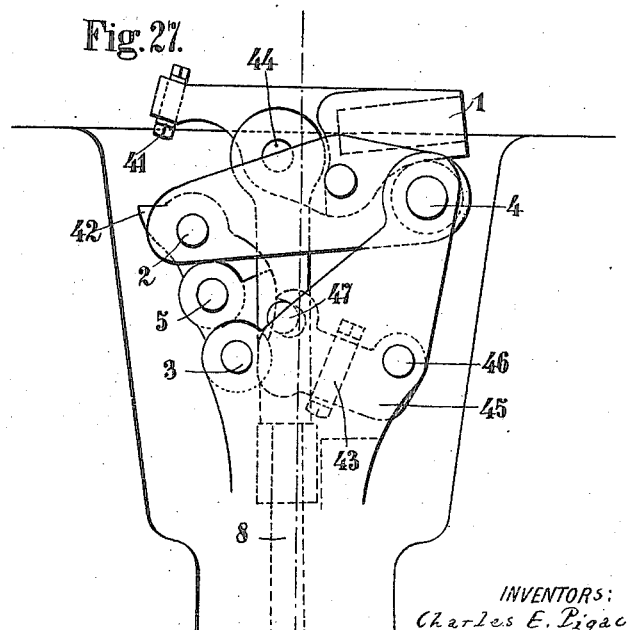

UNITED STATES PATENT OFFICE.

CHARLES EMILE PIGACHE AND PIERRE PIGACHE, OF PARIS, FRANCE.

TROLLEY-POLE DEVICE WITH AUTOMATIC RELEASE AND FOLDING.

1,187,782.   Specification of Letters Patent.   Patented June 20, 1916.

Application filed February 12, 1915.   Serial No. 7,845.

*To all whom it may concern:*

Be it known that we, CHARLES EMILE PIGACHE and PIERRE PIGACHE, two citizens of the Republic of France, and residents of Paris, France, (post-office address 206 Rue de Charenton, Paris,) have invented a new and useful Trolley-Pole Device with Automatic Release and Folding, which is fully set forth in the following specification.

This invention relates to a trolley mechanism by means of which the pole is automatically released and lowered when the trolley wheel jumps off the wire, the reëngagement being obtained by a simple traction exercised vertically on the free end of the pole.

The invention is chiefly characterized by the lower end of the pole proper, being mounted on an angular supporting frame which is collapsed at the moment when the wheel jumps off, in such a manner that the said pole is at that moment relieved from the action of its tension spring, and in that way falls under the action of its own weight. The traction exercised on the free end of the pole acts then so as to cause said frame to resume its original position, the pole thus being again exposed to the action of its tension spring.

To make the following explanation as clear as possible, the accompanying drawings show by way of example various embodiments of the invention.

Figure 2:
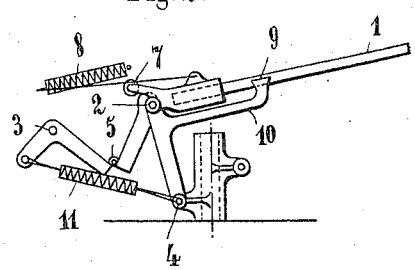
Figure 3:
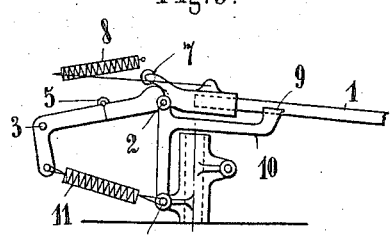
Figure 4:
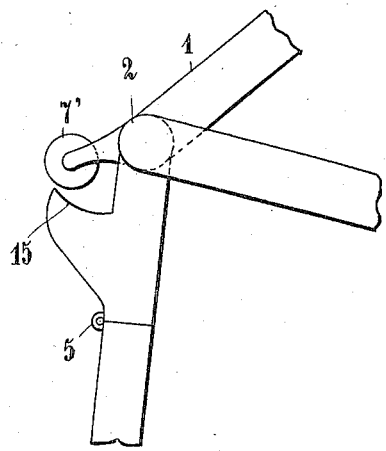
Figure 25:
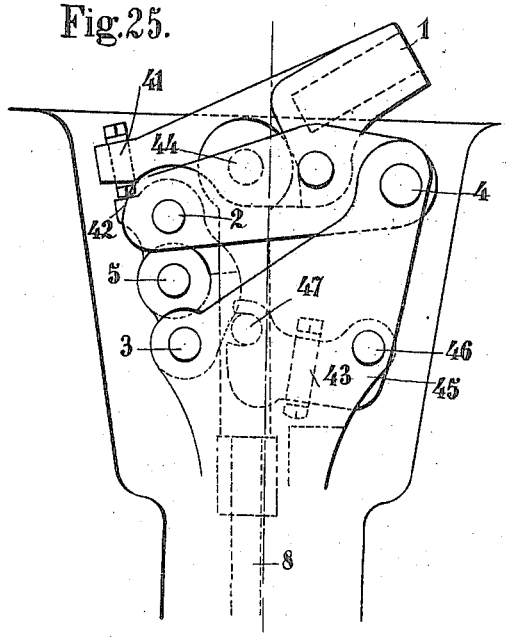
Figure 26:
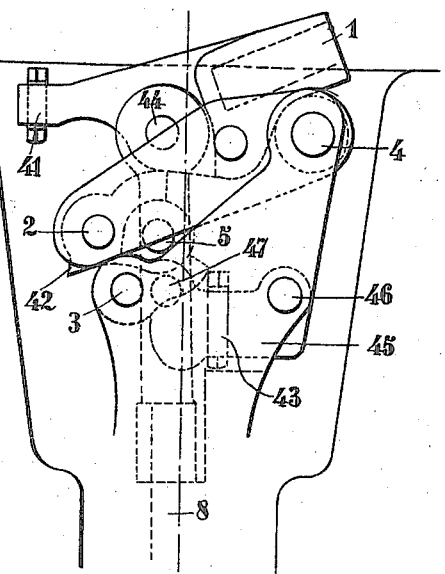

Figure 1 is a side elevation of one construction of the device, Figs. 2 and 3 show the same device as Fig. 1, at two different moments of its working, Figs. 4 to 6 show details of modified constructions of one of the parts of the device, Fig. 7 shows an improved construction of the same device, the working of which is explained in Fig. 8, which latter is a diagrammatic view, Figs. 9 to 12 show other modified constructions, Figs. 13 to 20 show an improved construction and some of its modifications, Figs. 21 and 22, on the one hand, and 23 and 24, on the other hand, show two other constructions of the same device. Figs. 25 to 27 show a final construction which is especially adapted for cars having outside seats.

In the construction of the apparatus shown in Fig. 1, the lower end of one of the poles proper, is pivoted to the apex 2 of an annular supporting frame 2, 3, 4 which is capable of being collapsed, such collapse being effected by dividing the side or member 2, 3 at a suitable point 5. The two sections 2, 5 and 3, 5 are then connected to each other by means of a joint, the points 3 and 4 being fixed relatively to each other. When the trolley wheel jumps off, the pole first swings upward and the arm 6, which is secured to the end of the pole and is provided with a roller 7, presses down on the section 2, 5 of the jointed member 2, 3 and operates the joint. The member 2, 3 is then bent and brought into the position shown in Fig. 2, while the member 2, 4 swings inward or counter-clockwise about the fixed point 4 under the action of the weight of the pole which, being no longer exposed to the action of its tension spring 8, the retraction of which is then stopped, falls by gravity and comes to rest in a fork or V-shaped part 9 provided at the end of the arm 10.

For the purpose of reëngaging, it is sufficient to exercise on the free end of the pole a downward traction. The entire pole and its arm 10 then swing about the point 4, in the direction opposite to that of the movement produced by the release. The jointed member 2, 3 resumes and retains its rectilinear position under the action of a "stiffening" device which, in the construction illustrated, is constituted by a spring 11 connecting the point 4 to an extension 12 of the section 5, 3 of the jointed member. The pole is then exposed again to the action of its tension spring 8 (Fig. 3) and its wheels can be replaced on the wire.

The parts of the mechanism described can be mounted between two cheeks or plates 13 of suitable shape, shown in dotted lines in Figs. 1 and 7, which plates, in turn, are fixed to a suitable bracket 14, shown in full lines in said figures.

It has been stated that the stiffening device of the jointed member may be constituted by a spring 11. It goes without saying however that any other equivalent means could be utilized for the same purpose, and any other suitable means may also be used for breaking the joint of the jointed member. By way of example, Figs. 4 to 6 show some modifications in which the breaking in question is obtained either by means of a roller 7' acting on an abutment 15 of suitable cross-section, provided on one of the sections of the jointed member (Fig. 4), or by means of a curved extension 16 provided on the lower end of the pole (Fig. 5), or by direct action of the pole at 17 (Fig. 6)

on the adjoining section of the jointed member.

Fig. 7 shows an improved construction of the device shown in Fig. 1. In this case, instead of the arm 10 provided in the preceding device, at the lower portion of the foot of the pole is provided a finger 18 which engages with an abutment forming portion of the connecting rod or member 2, 4 of the frame. The shock between the said finger and the said connecting rod may be moreover reduced by the interposition of a suitably arranged shock absorber of any desired kind. On the other hand, instead of the roller 7 used for acting on the jointed member 2, 3, the adjustment of which can only be very approximate, at the end of the arm 19 secured to the foot of the pole, is provided an adjustable finger 20 acting in the same manner, but capable of being accurately adjusted within very wide limits. The jointed member 2, 3 may be braced in any desired manner.

It must be pointed out that, in order to obtain greater efficiency of the apparatus, as well as to enable a tension spring to be used, whatever be its direction relatively to the horizontal, it is advisable to design the mechanism in such a manner that the axis of the said tension spring shall have the tendency to be parallel to the chord of the arc 2 2' (Fig. 8) when the pole is lowered.

The stiffening device for the jointed member may be further modified in details as shown in Figs. 9 and 10. In the construction shown in Fig. 9, the section 5, 3 of the jointed member is provided with an extension 21 on which is arranged a sliding balance weight 22. In this case there is of course no spring, unless to the balance weight is added a tension spring intended to absorb the oscillations due to the action of the balance weight. Finally, the construction shown in Fig. 10, does away with the use of any return system. In this case, the joint, as will be seen, is arranged in such a manner that at the moment when the joint is broken, the apex of angle formed by its two sections is not directed downward, as in the preceding constructions, but upward, and the stiffening is effected automatically by the simple action of the weight of the two sections.

Figure 11:
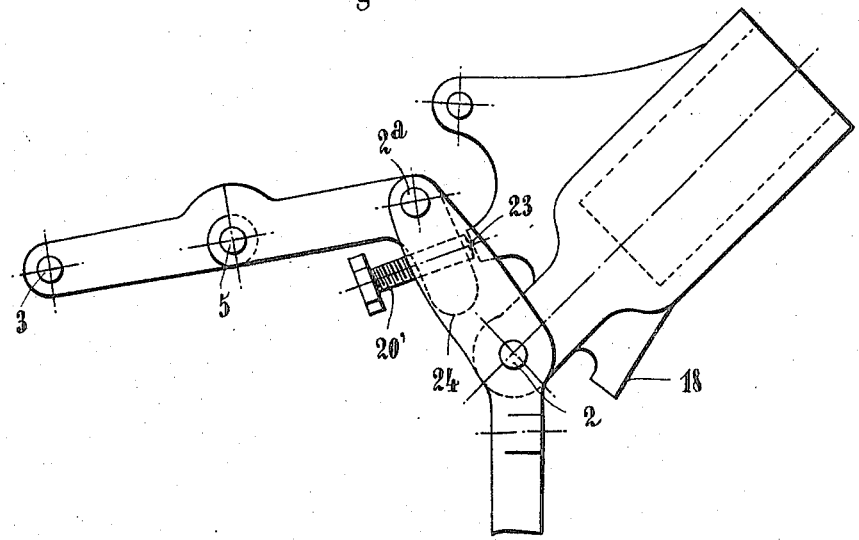

Fig. 11 shows a construction in which the adjustable finger 20 (Figs. 7 and 9) and the corresponding abutment are replaced by a shoulder 23 secured to the foot of the pole and engaging with an adjustable finger 20' mounted on the extension 24 of the jointed member 2ª, 5, 3. Owing to this arrangement, the connecting rod 4, 2 is extended to 2ª. It is obvious that, the strain on the stiffening device being tangent at 2 to the arc described by the pivot 2 during its rotation about the pivot 4, the part in question will be exposed to the minimum strain when the whole of the parts 2, 2ª, 3 will be tangent to the arc described by the said pivot 2.

Figure 12:
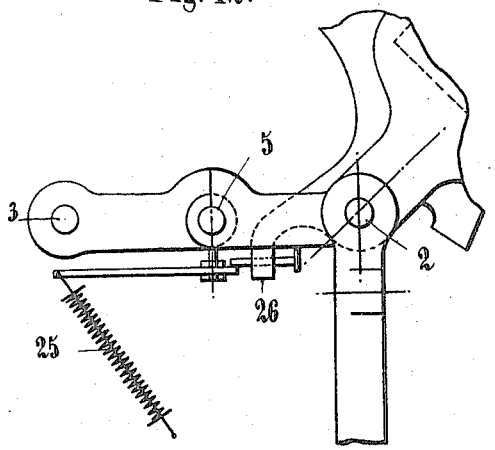

Fig. 12 shows a modified construction of the jointed member 2, 5, 3 in which the release producing the folding of the sections of said member when the pole jumps off, is obtained by the sudden expansion of a spring 25, taking place when the said spring is released by the withdrawal of the finger 26 mounted on an extension of the foot of the pole. The spring 25 may in this case also be of any desired kind.

In order to avoid the great length which it is necessary to give to the element 2, 2ª which length affects the strength of the part, and in order to do away with any release device such as a spring or an adjustable finger, there may be used a control system arranged in the form of a parallelogram or other four-sided figure. This construction of the apparatus is shown in Figs. 13 and 14. The foot of the pole 1 (Fig. 13) is provided with an extension 27, and at 3 is pivoted an arm 28 provided with a shoulder 23'. The arms 27 and 28 are finally connected together at their ends by the fourth side 29 of the pivoted parallelogram. When the roller jumps off the wire, the shoulder 23' acts as in the constructions previously described, on the adjustable finger 20' and breaks the joint of the member 2, 5, 3. The release takes place, and the various parts assume the position shown in Fig. 14.

A modification of the latter construction is shown in Figs. 15 and 16. The section 3, 5 is provided with an extension 30, the end of which is adapted to engage with the adjustable finger 20'. When the pole jumps off, the said finger has the tendency to push upward the section 3, 5; when the pin 5 has passed beyond the line connecting together the centers 2, 3, the connecting rod 2, 4 turns about the pin 4, and owing solely to the movement away of the pole pivoted at 2, the tension spring being stopped in its return movement, the said pole falls down until it arrives at the position shown in Fig. 16.

Figure 17:
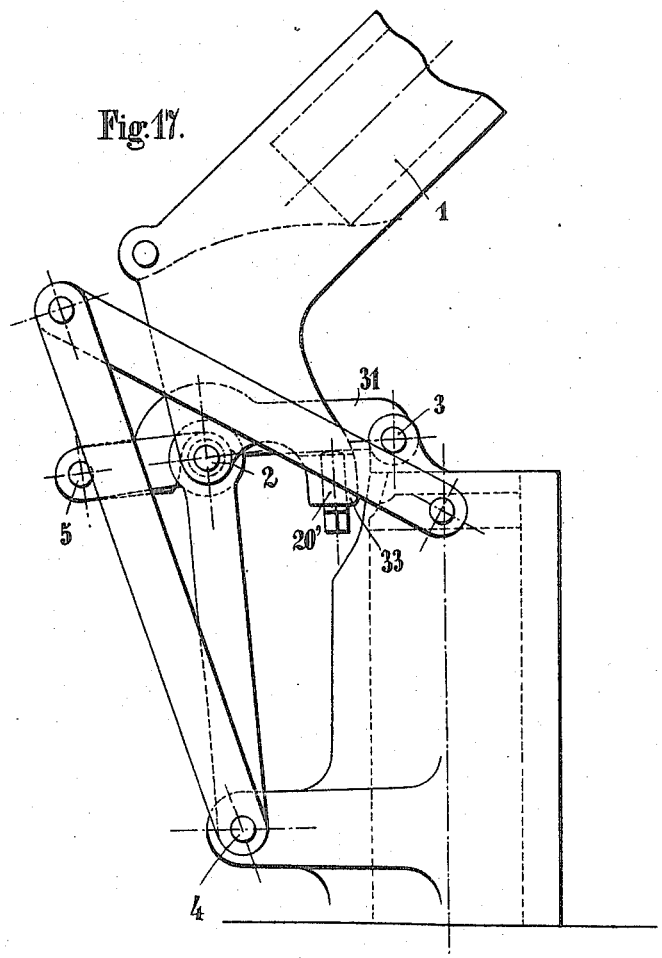
Figure 19:
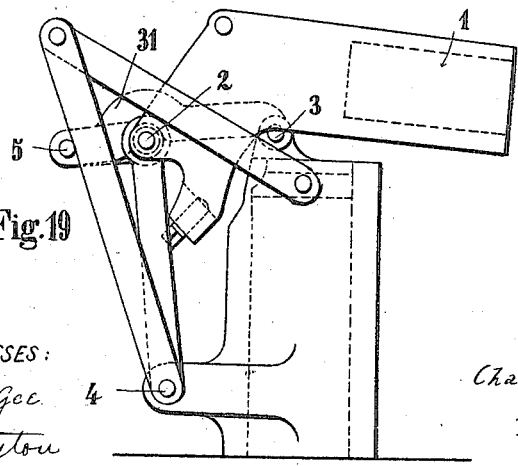

Figs. 17 to 19 show the application, to a construction of the foregoing kind, of an extensible stiffening device represented diagrammatically in Fig. 20, in which the stiffening device constitutes one of the sides of the collapsible triangular frame. In the construction shown in Figs. 17 to 19, which has the same characteristic parts as described for the preceding constructions, when the roller jumps off the wire, the screw 20' raises the notched arm 31 fulcrumed at 3. The pin 2 is then disengaged from the notch in said arm 31, the rod 2, 4 rotates about the pin 4, and owing solely to the backward movement of the pole pivoted at 2, its tension spring is stopped in its backward movement, and the said pole falls down until the shoulder 33 strikes at 34 the connecting rod 2, 4. Fig. 18 shows the device disengaged, and Fig. 19 shows the same device after traction has been exercised on the pole for reëngaging it.

In the constructions in which the stiffening device is pivoted to the same pin as the pole, there is the risk that when the latter changes its inclination according to the different heights of the line wire above the ground, it would carry by friction the pin of the stiffening device and thus produce disengagement at wrong moments.

Figure 23:
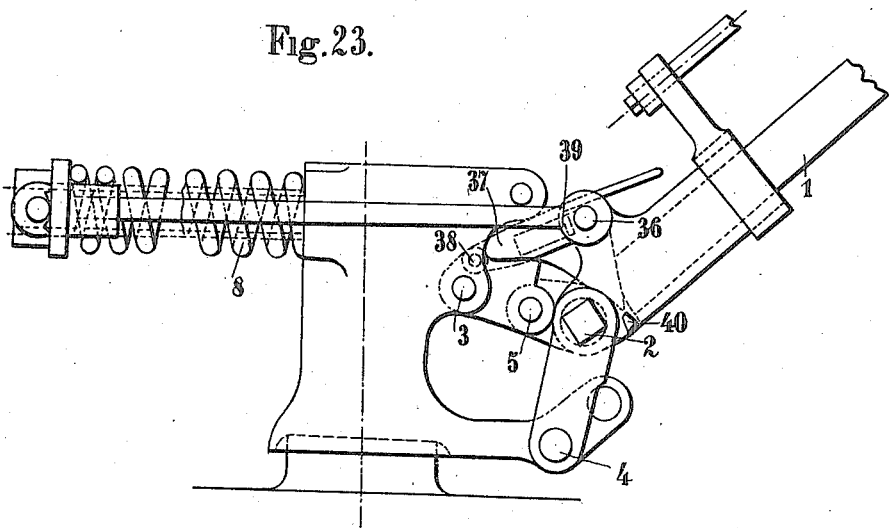

The drawbacks in question have been obviated by several means: (a) by locking the pin 2 of the connecting rod 2, 4 by means of a square head, as represented in Figs. 23 and 24, mentioned below. (b) by rendering the two pins (Fig. 21) of the pole and of the stiffening device, independent of each other by means of an interposed sleeve 35 (an arrangement applicable chiefly to the construction shown in the preceding figures, with the exception of Fig. 11). (c) by moving away from each other the pivot pins 2ª and 2 of the stiffening device and the pole respectively (Fig. 11).

Figs. 23 and 24 show an improved type by means of which the height of the base can be reduced, and consequently the passage of the pole over low points, bridges, etc.) facilitated. In this type which comprises all the characteristic elements described in the foregoing, the pin 36 moves at the beginning of the release movement along a release finger 37 pivoted on a pin 38, and immediately engages with the screw 39. The pin 38 is arranged in such a manner that a sufficient pressure exercised on the same, renders operative the stiffening device 2, 3 and consequently releases the pin 2. The latter, under the action of the fall of the pole, describes then an arc of a circle, until the whole is in equilibrium owing to the contact of the connecting rod 2, 4 with a suitably arranged projection 40 under the foot of the pole. The reëngagement takes place in a manner identical with that already described. Fig. 24 shows an identical construction, with the exception however of some modifications in detail, rendered necessary by the direction of the tension spring 8 which is inclined in a direction parallel to that of the pole, instead of being horizontal as in the preceding case.

Finally, Figs. 25 to 27 show a last construction, more particularly suitable for cars with outside seats, in which the free height between the roof of the car and the line wire, makes it impossible to use a pole of the preceding type, but requires on the contrary a working spring arranged below the base. This construction still comprises the same characteristic elements. At the moment of the release or disengagement the adjustable or set screw 41 (Fig. 25) engages with the projection 42 and brings about the folding of the stiffening device 2, 5, 3. The pin 2 rotates then about the pin 4, until the moment when the movement back of the tension spring is stopped by the screw 43. The pin 44 is then locked, and the pole pivots about it without any interference from the pin 2 which, on the contrary, has been released. The fall ceases when the lower portion of the foot of the pole engages with the pin 4. The movement back of the spring 8 is limited by a special part 45 pivoted about a pin 46 and engaging with a projection 47 secured to the stem of the tension spring. Fig. 26 shows the mechanism in the disengaged position. The reengagement (Fig. 27) still takes place as described in the foregoing.

It must be pointed out that the apparatus according to this invention is simple, exceedingly strong and requires very little upkeep. Its working is insured at any temperature, and moreover it has the great advantage of avoiding strains on the springs, as the apparatus can always be disengaged before the pole is replaced on the hook, or when passing specially low points. Finally, owing to its simplicity, it does not require that the whole of the mechanism should be inclosed in a case.

Claims:

1. In a trolley mechanism, the combination, with a pole; of a supporting frame therefor, comprising two angularly-arranged members having their outer ends pivotally-mounted at relatively fixed points, and their inner ends pivotally connected together, one of said members having said pole pivoted thereto, and being provided with a break-joint; means acting to automatically break said joint when the trolley wheel jumps the wire; and means acting, by the imposition of pressure vertically against said pole, to initially cause the latter and said jointed member to swing bodily about one of the two aforesaid fixed points, and to subsequently straighten out said joint by exerting traction thereon.

2. In a trolley mechanism, the combination, with a pole; of a supporting frame therefor, comprising two angularly-arranged members having their outer ends pivotally-mounted at relatively fixed points, and their inner ends pivotally connected together, one of said members having said pole pivoted thereto, and being provided with a break-joint; a tension spring associated with said pole, to normally hold the trolley wheel against the wire; means on said pole arranged to impose pressure against said jointed member, to break the joint, when said wheel jumps said wire; means for limiting the retraction of said spring while said joint is so broken, and for causing the pole to fall by its own weight; means for limiting the fall of the released pole; and means acting, by the imposition of pressure vertically against said pole, to initially cause the latter and said jointed member to swing bodily about one of the two aforesaid fixed points, and to subsequently straighten out said joint by exerting traction thereon.

In testimony whereof we have signed this specification in the presence of two subscribing witnesses.

CHARLES EMILE PIGACHE.
PIERRE PIGACHE.

Witnesses:
EMILE LEOBRET,
DE WITT C. POOLE, Jr.

Copies of this patent may be obtained for five cents each, by addressing the "Commissioner of Patents, Washington, D. C."